Dec. 17, 1968 R. P. FRITSCH 3,416,774
WORM MIXING DEVICES
Filed Feb. 2, 1967 5 Sheets-Sheet 5

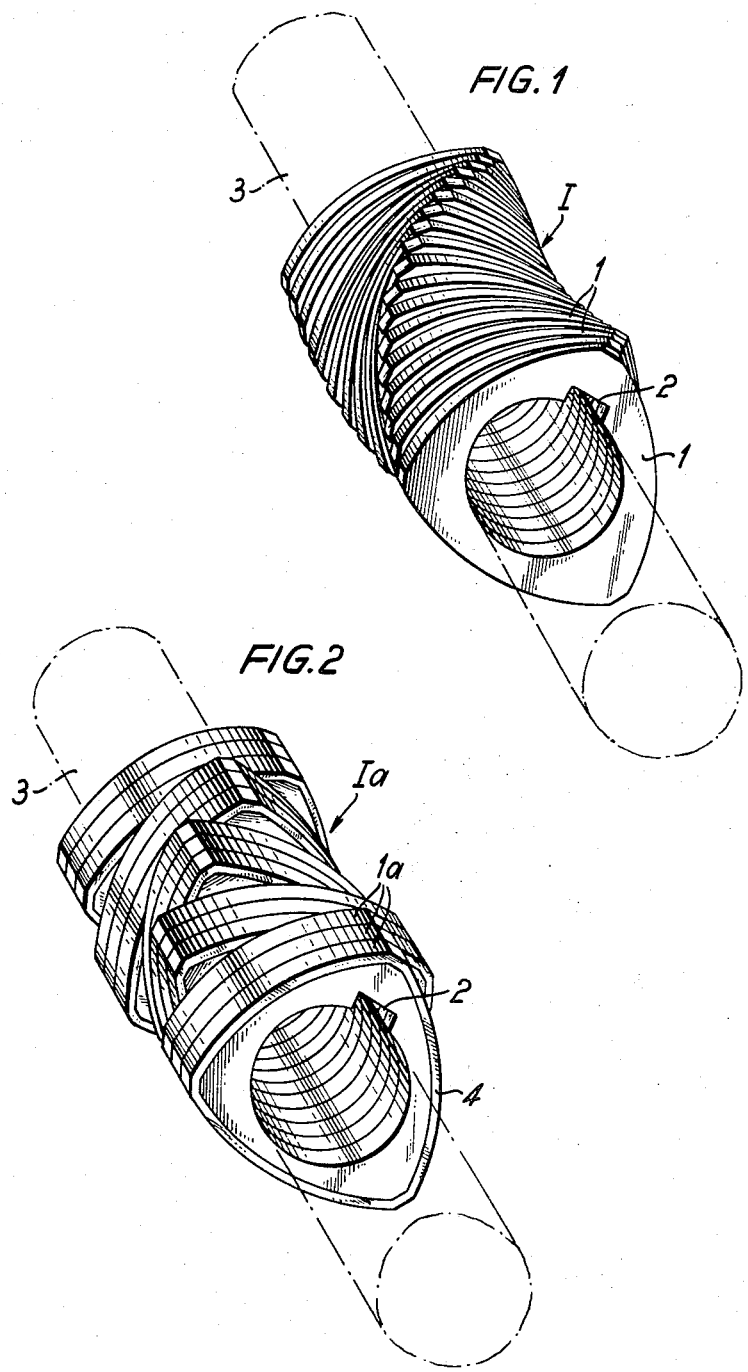

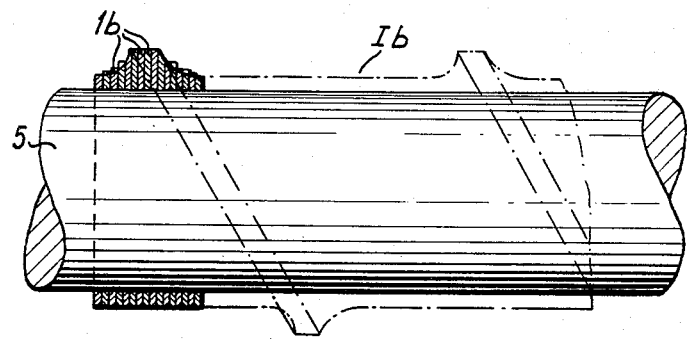
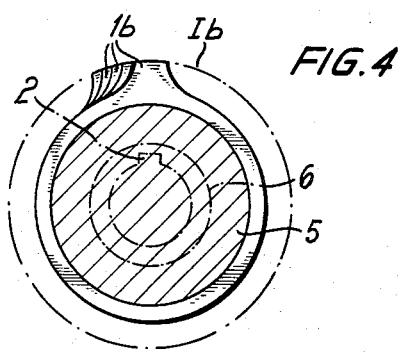
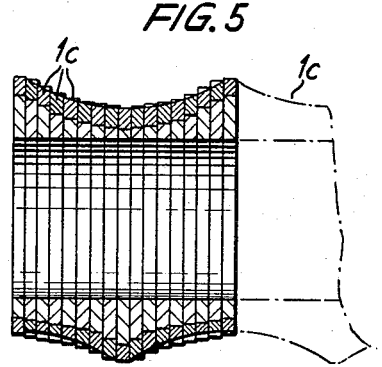
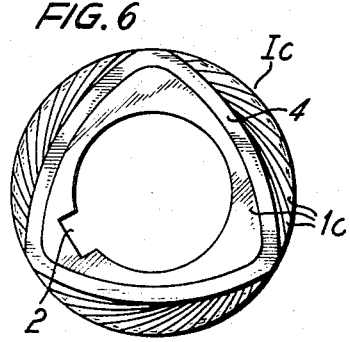

INVENTOR
Rudolf Paul Fritsch

BY Hancock, Downing & Seebold
ATTORNEYS

United States Patent Office 3,416,774
Patented Dec. 17, 1968

3,416,774
WORM MIXING DEVICES
Rudolf Paul Fritsch, Stuttgart-Weilimdorf, Baden-Wurttemberg, Germany, assignor to Werner & Pfleiderer, Stuttgart-Feuerbach, Germany, a corporation of Germany
Filed Feb. 2, 1967, Ser. No. 613,513
Claims priority, application Germany, Feb. 11, 1966, W 40,921
4 Claims. (Cl. 259—109)

ABSTRACT OF THE DISCLOSURE

A worm mixing apparatus in which a worm and the housing therefor consist of a plurality of plates with wear resistant peripheral portions joined in face-wise relationship which ensures reliability in operation with respect to the transmission of large torques and the resistance to heat and wear.

This invention relates to a worm or a casing for mixing or kneading machines and the like, in which the worm is adapted to be connected to a driving shaft. Mixing or kneading machines having a worm as a mixing member have proved best in practice for the continuous treatment of a wide variety of materials. Devices of this type make it possible to control the material being treated during the entire mixing operation, in particular to accurately control the mixing time.

A number of worm machines of various sizes and designs have been developed to correspond to the manifold materials to be treated. In one known device the mixing members are made from cam discs which are keyed on a corresponding supporting shaft in the manner of a spiral staircase. In spite of the multiple possibilities of application of devices of the aforementioned kind, difficulties arise in cases in which owing to the temperature, wear and high torques, the connection between the individual cam discs and the supporting shaft is not adequate to absorb or transmit the torque over the whole period of operation with sufficient reliability and therefore the resultant wear jeopardises the economy of such a device.

The invention is based on the problem of removing disadvantages of this kind and of providing a worm and casing for mixing or kneading machines, which make it possible to ensure reliable working the predetermined duration of operation of the whole device, both as regards the transmission of relatively large torques and the resistance to temperature and wear.

According to the invention this is achieved by forming the worm and the casing of individual plates which when combined forms an undetachable unit by the inserting between each two plates of a setting joining agent. By this procedure it is now possible for plates to be formed individually, which will reduce costs. Non-cutting shaping of the individual plates offers the possibility of manufacturing worms and casings accurately in any length at extremely narrow tolerances. The plates are combined to form an integral unit which is able to transmit relatively large torques and ensures a simple and economic connection with corresponding supports, i.e. a shaft or a casing member.

According to the invention the worms or other mixing members, worm casings or worm drives can be formed from a suitable number of plates in any size, pitch, configuration or material and combined into a single unit.

In addition to the advantage achieved by the invention as regards the transmission of even maximum torques, it is possible to form parts of the plates of different materials and thus in a simple manner able to operate under various temperature and stress conditions. Thus, for example, it is possible to form the peripheral portion of the plates with wear-resistant and/or temperature-resistant material, a rim of the wear-resistant unit is then integrally formed with the individual plates at their peripheries, the single unit employing a connecting means as hereinabove mentioned. In this way it is readily possible to manufacture worms and worm drives or casings which consist of different materials and may thus be particularly adapted to operating conditions.

In order to also ensure a safe and reliable connection between the worm or casing plates forming the unit and to its corresponding support, it is possible at the same time to join the plates to their support to form an integral and undetachable unit.

As mentioned hereinabove, the worm and the casing may be formed from individual plates. It is moreover possible for the worm and the casing to be formed over its entire length from plates which vary in thickness and choice of material and are joined together to form an integral unit. For example, the size of the plates may vary over the whole length of the worm or the casing, for example, the size of the plates could increase or decrease uniformly so as to give a substantially conical configuration. Further, the plates may be staggered either uniformly or nonuniformly over the length of the worm. By this measure one may obtain various pitches over the entire length or parts of the worm.

The joining of the individual plates to one another or its supports may be carried out by bonding, for example, soldering, welding or glueing. It is advisable to apply to the connecting surfaces of each of the plates an adhering medium. The particular type of connection will depend on the proposed use and operating conditions of the apparatus. For example, the individual plates could be joined by soft or hard soldering. In the first case it would be possible to provide the plates with a zinc layer or the like and to prepare for assembly of plates into a single unit by heating. Similarly joining by bonding, for example, hard soldering, induction welding or glueing is possible. This also applies to cases in which the individual plates are formed with parts of different materials.

Various changes and modifications are possible within the scope of the invention, particularly as regards the joining of the individual plates, without thereby restricting the advantages obtainable by the invention.

Embodiments of the invention are shown in the drawings, in which:

FIGURE 1 is a perspective view of a worm formed from individual plates.

FIGURE 2 is a perspective view of another embodiment of a worm design, in which the individual plates comprise portions made of different materials.

FIGURE 3 is a longitudinal section through a worm, of a further embodiment which is formed from individual plates.

FIGURE 4 is a cross-section through a worm according to FIGURE 3 in a modified design.

FIGURE 5 is a multi-thread worm in longitudinal section.

FIGURE 6 is a cross-section through a worm according to FIGURE 5.

Figure 7:
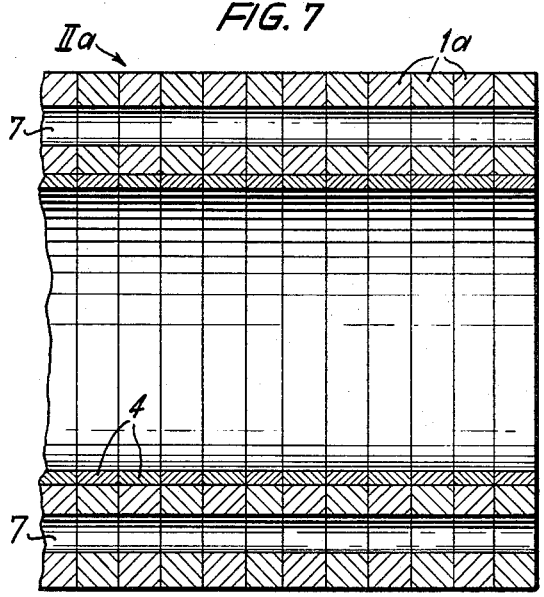
FIGURE 7 is a longitudinal section of another embodiment through a worm casing consisting of individual plates.
Figure 8:
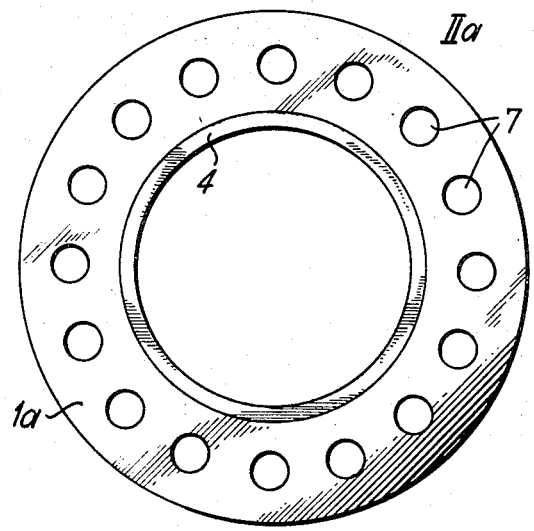
FIGURE 8 is a cross-section through the worm casing according to FIGURE 7.

As shown in FIGURE 1, the worm I is formed from individual plates 1, which are provided with a groove to accommodate a key. The individual plates 1 are bonded to one another by means of a bonding medium, for example, solder or adhesive, to form an integral unit and are arranged on a shaft 3 indicated in FIG. 1 in dash-dot lines.

FIGURE 2 of the drawing shows an alternative worm design Ia, which likewise consists of individual plates 1a, the outside of which has a peripheral portion or rim 4 of a wear-resistant and/or temperature-resistant material for example case-hardened metal. Both the rim 4 and the plates 1a are bonded to one another by solder or the like to form an integral unit. The whole worm Ia formed in this way is, just like the worm I shown in FIGURE 1, arranged on a shaft 3 indicated in dash-dot lines in FIGURE 2 of the drawing and connected by a key means not shown in detail.

A further embodiment of a worm is shown in FIGURE 3 of the drawing. Here the worm Ib is formed from plates 1b consisting only of a temperature and/or wear-resistant material, for example case-hardened metal, the plates 1b are joined to one another and to a supporting shaft 5 by bonding, for example glueing, welding or soldering to form an integral unit. In the embodiment shown in FIGURE 3 a single-thread worm is formed, the individual plates 1b, as shown in FIGURE 4 of the drawing, are staggered relative to one another to obtain the desired pitch.

Another embodiment of the corresponding worm is indicated in FIGURE 4 of the drawings. The individual plates 1b are similar to the embodiment according to FIGURE 2, i.e. like the plates 1a, with the exception that they have on their inside an insert 6, indicated in dash-dot lines which contains a groove 2 for a key means, so that the individual plates can be joined to a supporting shaft in accordance with the arrangement shown in FIGURES 1 and 2.

Further FIGURES 5 and 6 of the drawing show a triple-thread double worm Ic which is formed from individual plates 1c having in each case a peripheral rim 4 of another material. The joining of the individual plates with one another is carried out by soldering, glueing, or induction welding, the connecting of the worm Ic or the worm drive to the shaft 3, indicated in dash-dot lines, is effected by a key means.

Just as the worms or worm drives may be formed from individual plates, the manufacture of a casing therefor from individual plates is shown in FIGURES 7 to 10 of the drawing. FIGURE 7 illustrates a section of a casing IIa, which is formed from individual plates 1a.

Here again the individual plates 1a, like the plates of the worm according to FIGURE 2 of the drawing, are provided with an inner rim 4 of another material and joined together to form an integral unit, the joining being effected by bonding, for example, soldering, welding or glueing. The plates 1a provided for the casing IIa can likewise be formed in a manner similar to plates for a worm, as set out hereinabove. Bores 7 for the passage of a heating or cooling medium or of reinforcing means are also shown.

Figure 9:
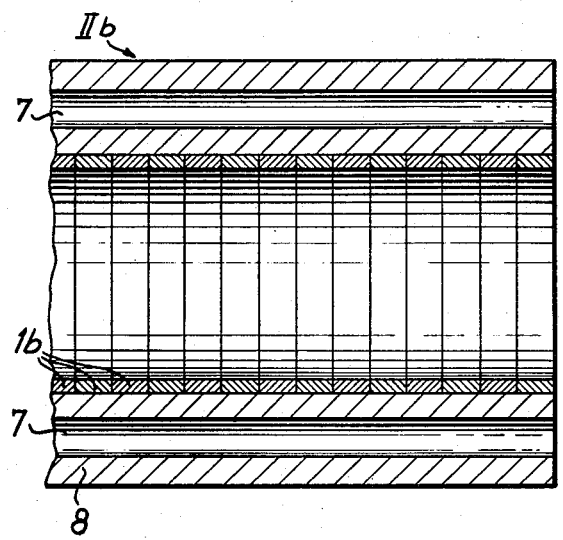
FIGURE 9 is a modified worm casing in longitudinal section.
Figure 10:
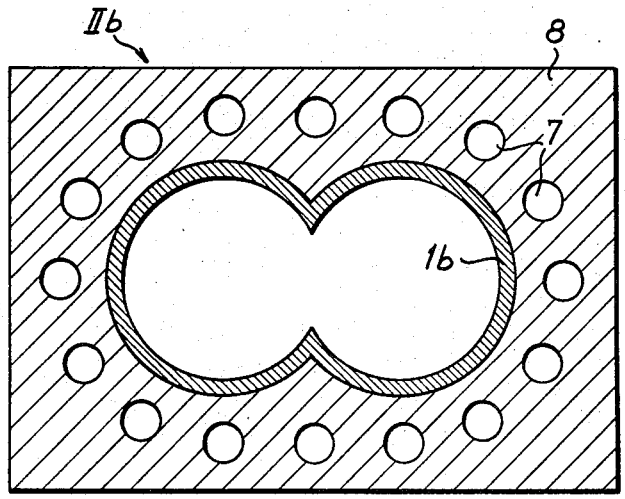
FIGURE 10 is a cross-section through the worm casing according to FIGURE 9.

Further FIGURES 9 and 10 show a casing IIb for worms, in which the plates 1b are inserted in a carrier 8. In the casing block the plates are bonded together to form single unit by welding, soldering or glueing.

The casing IIb with the plates 1b may be adapted for particular operating conditions and made wear and temperature resistant. At the same time, as in the case IIa, bores 7 may be provided for the passage of a heating or cooling medium or to accommodate reinforcing means.

Figure 11:
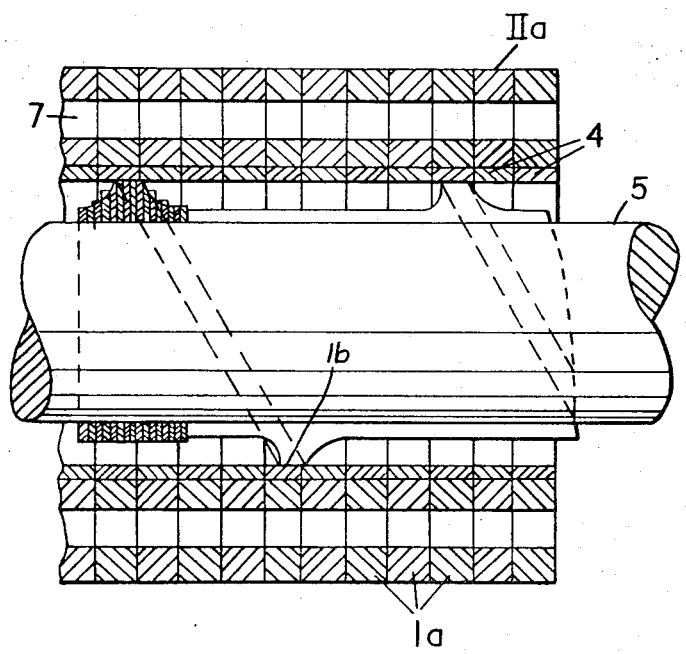
FIGURE 11 is a view partly in section and partly in elevation of the housing and the mixer therein.

Finally, FIGURE 11 illustrates the combination of a shaft 5 having a cutting worm 1b, such as disclosed in FIGURE 3, and a worm casing IIa including individual plates 1a with an inner peripheral rim 4 of a different material, such as shown in FIGURE 7. It should be recognized that various combinations of worms and worm casings are within the scope of the invention, for example, the worms illustrated in FIGURES 4 and 6 may be used in combination with the worm casing disclosed in FIGURE 7 or 9.

The choice of the particular composition of the plates and of their joining to one another and/or to their support, as well as the choice of the associated casing, can be modified in many ways within the scope of the invention and adapted to the particular operating conditions in each case. As mentioned above the pitch and/or size or composition of the individual plates may be varied according to the size and material over the length of a worm or casing to adapt the apparatus for particular operating conditions.

I claim:

1. A worm mixing apparatus comprising a housing, a shaft having a linear key means running along its length and rotatably mounted in the housing, a plurality of worm plates fixedly mounted on the shaft for rotation therewith, the outer peripheral surface of each worm plate formed of wear resistant material and a key-way adapted to receive said key means, bonding means joining worm plates in face-wise abutment to each adjacent worm plate, and each key-way angulated with respect to each adjacent key-way so that the plurality of worm plates forms a continuous worm mixing element, the casing including a plurality of casing rings, bonding means joining adjacent rings in face-wise abutment to form an integral cylindrical housing, the inner surface of the casing rings formed of a wear resistant material, so that upon mixing the casing and the worm withstand the abrasion and high torque due to mixing.

2. A worm mixing apparatus according to claim 1, wherein bores are provided longitudinally through the housing for passing fluids for heat treatment.

3. A worm mixing apparatus according to claim 1, wherein the worm plates are arranged on the shaft to form a plurality of worms along the shaft.

4. A worm mixing apparatus according to claim 1, wherein the worm plates are of various sizes and widths.

References Cited

UNITED STATES PATENTS

| 2,485,854 | 10/1949 | Zona | 259—9 |
|---|---|---|---|
| 2,840,356 | 6/1958 | Wills | 259—9 |
| 2,868,143 | 1/1959 | Strahmann | 259—9 XR |

ROBERT W. JENKINS, *Primary Examiner.*

U.S. Cl. X.R.

259—104